United States Patent
Pigott et al.

(10) Patent No.: US 6,499,207 B1
(45) Date of Patent: Dec. 31, 2002

(54) AUTOMATED METHOD FOR FABRICATING A WROUGHT-IRON FENCE

(76) Inventors: Patrick C. Pigott, P.O. Box 12589, Jackson, MS (US) 39236; Woodruff J. Kozlow, 10720 Skyhawk Dr., New Port Richey, FL (US) 34654; Davis E. Warren, 108 Sleepy Hollow La., Clinton, MS (US) 39056

( * ) Notice: Subject to any disclaimer, the term of this patent is extended or adjusted under 35 U.S.C. 154(b) by 0 days.

(21) Appl. No.: 09/672,150

(22) Filed: Sep. 25, 2000

Related U.S. Application Data

(60) Division of application No. 09/133,113, filed on Aug. 12, 1998, now Pat. No. 6,151,772, which is a continuation-in-part of application No. 08/975,986, filed on Nov. 21, 1997, now Pat. No. 6,151,172.

(51) Int. Cl.[7] .......................... B23P 19/04; B23P 11/00; B21B 1/46; B65G 37/00
(52) U.S. Cl. ................. 29/460; 29/525.14; 29/527.2; 29/713; 198/577
(58) Field of Search .................. 29/460, 429, 430, 29/525.14, 527.1, 527.2, 897, 897.3, 897.31, 897.32, 897.33, 418, 713; 219/137.31; 198/322, 577, 571, 575, 576, 678.1; 700/96, 117, 145

(56) References Cited

U.S. PATENT DOCUMENTS

| | | | | |
|---|---|---|---|---|
| 4,073,475 A | * | 2/1978 | Gordon | 254/66 |
| 5,324,914 A | * | 6/1994 | Murray, Jr. et al. | 219/137 |
| 5,374,331 A | * | 12/1994 | Costello | 156/640 |
| 5,622,249 A | * | 4/1997 | Morin | 198/499 |
| 5,842,492 A | * | 12/1998 | Lee | 134/176 |

FOREIGN PATENT DOCUMENTS

| | | | |
|---|---|---|---|
| GB | 2263423 | * | 7/1993 |
| JP | 408173872 | * | 7/1996 |

* cited by examiner

Primary Examiner—David P. Bryant
Assistant Examiner—John C. Hong
(74) Attorney, Agent, or Firm—Reginald F. Roberts, Jr.

(57) ABSTRACT

Automated method and machinery for fabricating a wrought-iron fence panel. The machinery includes (a) automated programmable machinery for welding vertical pickets to horizontal runners to form a fence panel; (b) automated programmable machinery for straightening the fence panel; (c) automated programmable machinery for washing the fence panel; (d) automated programmable machinery for drying the fence panel; (e) automated programmable machinery for painting the fence panel; and (f) automated programmable conveyor machinery for conveying the vertical pickets, the horizontal runners, and the fence panel from station to station.

7 Claims, 7 Drawing Sheets

AUTOMATED METHOD FOR FABRICATING A WROUGHT-IRON FENCE

This is a division of application Ser. No. 133,113, filed Aug. 12, 1998. This application is a continuation-in-part of application Ser. No. 08/975,986, filed Nov. 21, 1997 now U.S. Pat. No. 6,151,772.

BACKGROUND OF THE INVENTION

The present invention relates to fence construction. More particularly, the invention relates to an automated process for fabricating wrought-iron fences.

SUMMARY OF THE INVENTION

In general, the present invention in a first aspect provides an automated method for fabricating components of a wrought-iron fence. The method comprises the steps of (a) providing a plurality of horizontal runners and a plurality of vertical pickets; (b) automatedly welding the vertical pickets to the horizontal runners to form a fence panel; (c) automatedly transferring the fence panel to a table run-out conveyor which includes a set of chains with a pickup block on each chain; (d) utilizing the table run-out conveyor to automatedly transfer the fence panel to a conveyor loading station which includes a hydraulic-driven unit with pickup hooks capable of conveying the fence panel; (e) utilizing the hydraulic-driven unit to automatedly transfer the fence panel to an overhead conveyor line; (f) utilizing the overhead conveyor line to automatedly transfer the fence panel to a fence section straightener; (g) utilizing the fence section straightener to automatedly straighten the fence panel; (h) utilizing the overhead conveyor line to automatedly transfer the straightened fence panel to a wash tank; (i) utilizing the wash tank to automatedly wash the fence panel; (j) utilizing the overhead conveyor line to automatedly transfer the washed fence panel to a drying station; (k) utilizing the drying station to automatedly air-dry the washed fence panel; (l) utilizing the overhead conveyor line to automatedly transfer the dried fence panel to a paint tank; and (m) utilizing the paint tank to automatedly paint the fence panel.

In a second aspect the invention provides automated machinery for fabricating components of a wrought-iron fence from a plurality of horizontal runners and vertical pickets. The machinery comprises: (a) automated programmable means for welding the vertical pickets to the horizontal runners to form a fence panel; (b) automated programmable means for straightening the fence panel; (c) automated programmable means for washing the fence panel; (d) automated programmable means for drying the fence panel; (e) automated programmable means for painting the fence panel; (f) automated programmable conveyor means for conveying the fence panel from the welding means to the fence-straightening means; (g) automated programmable conveyor means for conveying the fence panel from the fence-straightening means to the washing means; (h) automated programmable conveyor means for conveying the fence panel from the washing means to the drying means; and (i) automated programmable conveyor means for conveying the fence panel from the drying means to the painting means.

DETAILED DESCRIPTION OF THE INVENTION

Figure 1:
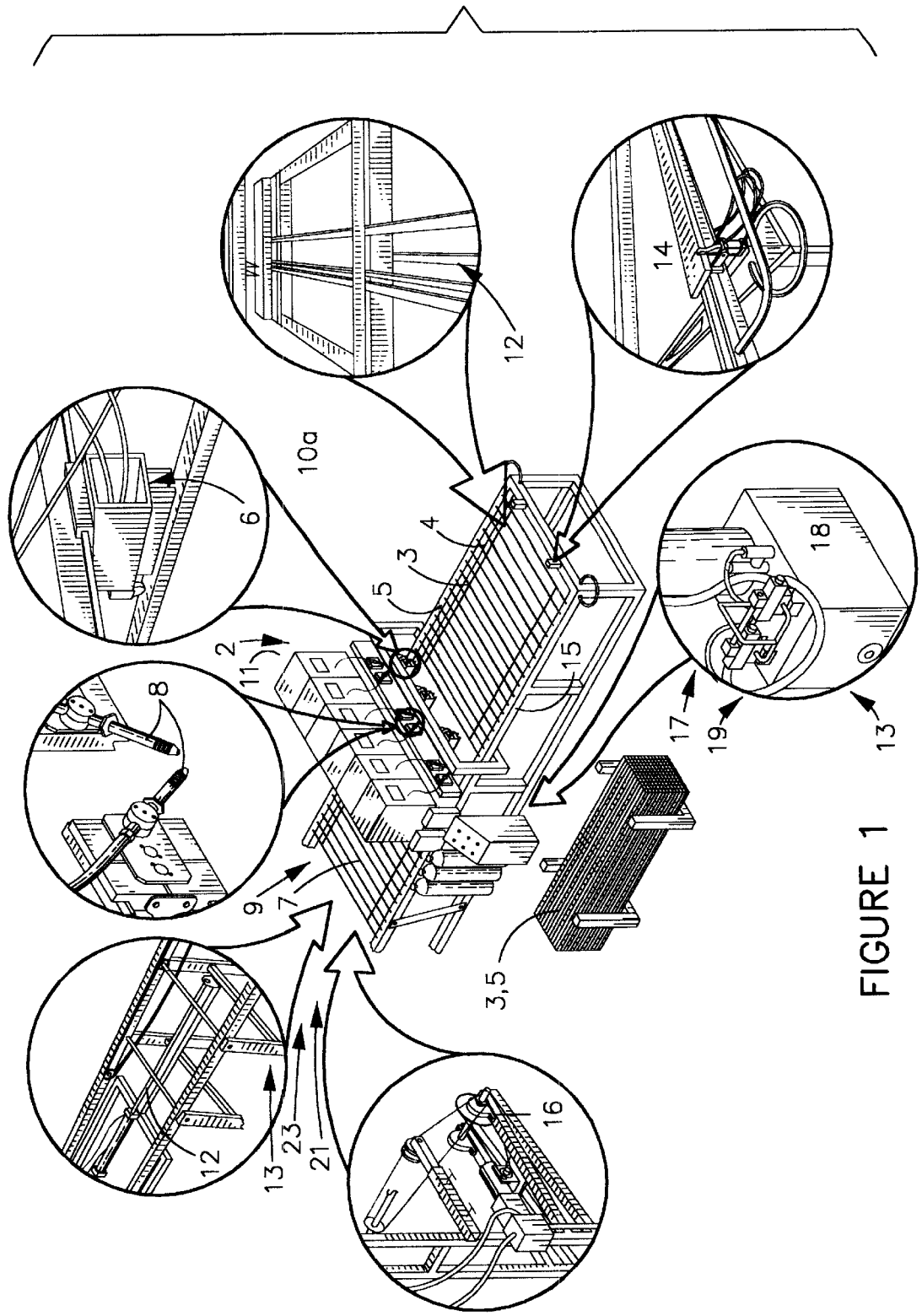
FIG. 1 is a schematic representation of an automated welding machine made in accordance with the principles of the present invention.

More specifically, reference is made to FIG. 1, in which is shown an automated welding machine, made in accordance with the principles of the present invention, and generally designated by the numeral 2.

The automated welding machine 2 comprises a programmable, movable carriage 4; programmable pneumatic means 14 for automatedly clamping horizontal runners 3 to vertical pickets 5 in a perpendicular configuration on the movable carriage 4, by clamps 6 automatedly powered and operated by automated pneumatic means 14; a hydraulic cylinder 12, for forward and reverse movement of the carriage 4; a plurality of programmable welding guns 8, for welding the horizontal runners 3 to the vertical pickets 5, to form a fence panel 7; and a programmable photocell switch 10a for a hydraulic feed-speed control valve 11, indexing the movable carriage 4 to move at a slower speed during the welding operation, and at a faster speed for conveying the clamped horizontal runners 3 and vertical pickets 5 to and under the welding guns 8 for welding, and away from the welding guns 8 after the vertical pickets 5 have been welded to the horizontal runners 3.

The horizontal runners 3 and the vertical pickets 5 are manually loaded onto the movable carriage 4 with panel fixture. An operator then starts the automated welding machine 2, which pneumatically clamps the vertical pickets 5 to the horizontal runners 3, and automatedly indexes the carriage 4 for the faster and slower speeds.

Figure 7:
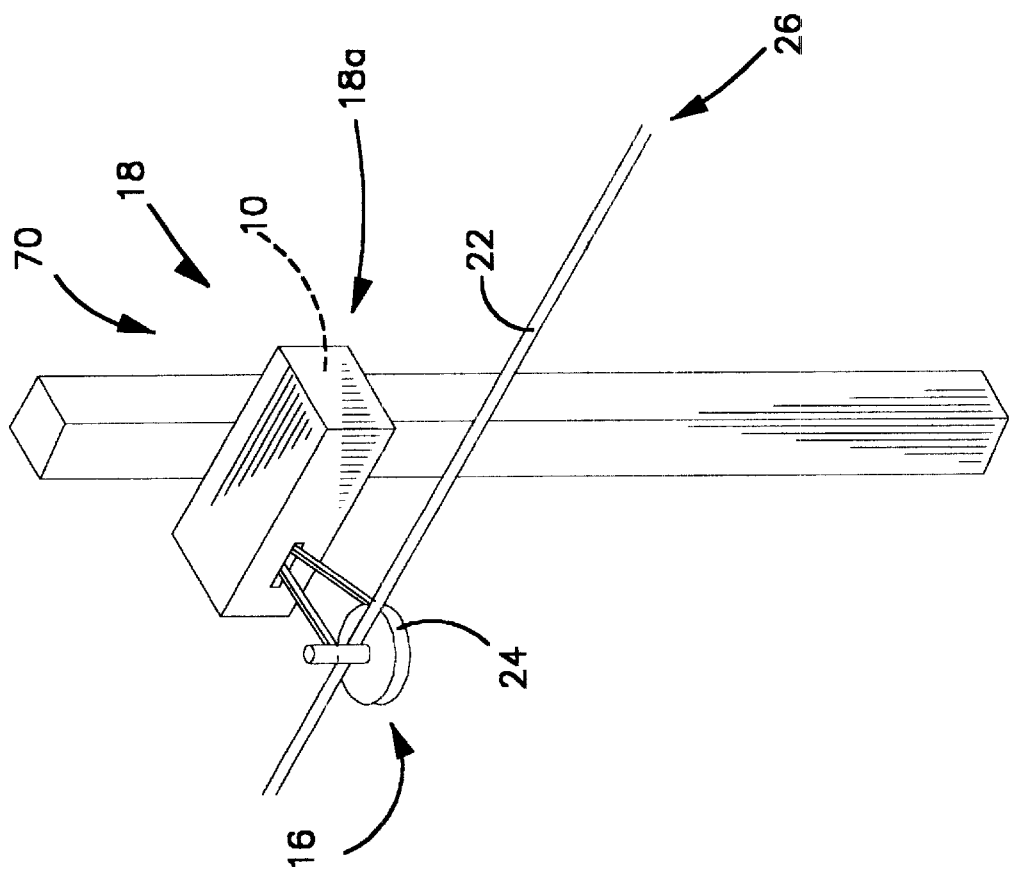
FIG. 7 is a schematic representation of an automated conveyor system made in accordance with the principles of the present invention.

Reference is now made to FIG. 7, in which is shown an automated conveyor system, made in accordance with the principles of the present invention, and generally denoted by the numeral 70. The automated conveyor system 70 comprises a plurality of hydraulic power units 18; an overhead cable 22; a pulley 24; a plurality of limit switches 10; a plurality of timers 64; a plurality of chain-and-sprocket units 16; and a plurality of hooks 26.

Reference is again made to FIG. 1.

After the operator pushes a start switch 9, the carriage 4 will "rapid travel" to the first picket 5 to be welded. At this point the photocell switch 10a will switch the hydraulic feed-speed control valve 11 from "rapid travel" to "feed speed." After the picket 5 has been welded to the runner 3, the photocell switch 10a will then switch to "rapid travel" for the next picket 5 to be welded.

After the last picket 5 has been welded, the carriage 4 will "rapid travel" forward to the end of the stroke of the hydraulic cylinder 12. An elevator 13 controlled by a limit switch 10 will then lift the welded fence panel 7 from the movable carriage 4. When the elevator 13 is in "full up" position, the carriage 4 will return to the start position. At the same time the conveyor system 70 will move the fence panel 7 away from the welding machine 2, using the overhead cable 22, a pulley 24, and hooks 26.

The automated welding machine 2 further comprises a base 15 on which the movable carriage 4 is mounted. The base 15 has an inverted "V" rail 17 and a "flat" rail 19 to channel the carriage 4 for forward and reverse motion. The hydraulic cylinder 12 raises and lowers the elevator 13. The carriage 4 has two "flat wheels" and two "V-groove wheels." The hydraulic cylinder 12, which preferably has a one-hundred-and-forty-four-inch stroke, is mounted on the carriage 4, with its rod end anchored to the base 15. The hydraulic power unit 18, which is preferably a three-horsepower unit, is rigidly mounted to the base 15. The output of the hydraulic power unit 18 is preferably about three and one-half gallons per minute at a pressure of approximately five hundred pounds per square inch gauge. An overhead gantry 21 is mounted on the base 15. The gantry 21 has mounted thereon six welding guns 8 and a "T" bar rail 23. On the bar rail 23 are mounted six welding-torch dove-tail slides, with torch holders and torches. Screw handles allow torch adjustment in and out as well as up and down. The torches are preferably set up at approximately a forty-five-degree angle. Flexible cables run from the welder units to torches approximately forty-eight inches long. Elevator 13 lift is accomplished by arms with a rocker movement and the hydraulic cylinder 12. A second gantry is mounted on the base 15 forward of the welding torches. To the second gantry is mounted an adjustable air-powered hold-down guide and clamps, to navigate each horizontal runner 3 to its correct spacing and position. A guide of brass sidewalls with a roller hold-down applies pressure on the horizontal runner 3 to keep it tight on the picket 5 during welding. Small air cylinders apply the downward pressure to the front of the runner 3, to hold the runner in position. The small air cylinders are activated when the carriage 4 moves forward from the start position. Along with the small air cylinder a set of air-cylinder clamps aid in applying downward pressure to the rear of the runner 3. The air-cylinder clamps are activated by forward motion of the carriage 4 and by an air valve (not shown), and are retracted at the end of the welding cycle.

Figure 2:
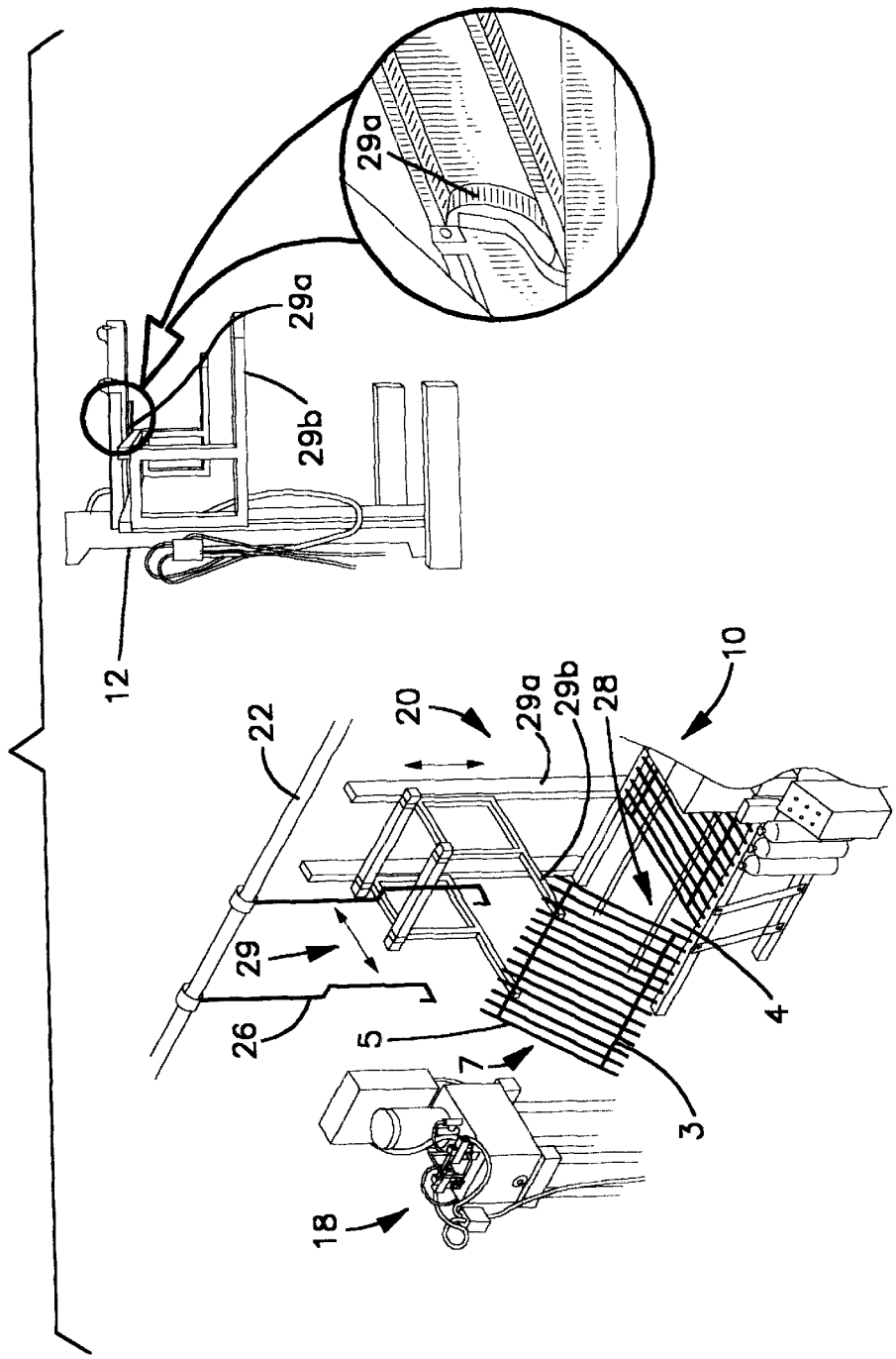
FIG. 2 is a schematic representation of an automated table run-out conveyor and an automated conveyor load station, made in accordance with the principles of the present invention.

Reference is now made to FIG. 2, in which is shown an automated table runout conveyor 28 and an automated conveyor loading station 29, made in accordance with the principles of the present invention, the combination being generally designated by the numeral 20.

After the fence panel 7 has been moved down line of the welding machine 2 by the automated conveyor system 70 (FIG. 7), the automated conveyor loading station 29 picks up and hangs the fence panel 7 on the overhead cable 22.

The automated table run-out conveyor 28 comprises a set of chains (not shown) with a pickup block (not shown) on each chain. The pickup blocks are mounted on a special link, which allows normal functioning of the chain while conveying the panel 7 via the attached pickup blocks. The conveyor 28 is started and stopped by two limit switches 10. When the elevator 13 (FIG. 1) is in "full up" position—its highest point—a limit switch 10 activates the conveyor 28 to move the panel 7 from the welding machine 2 (FIG. 1) to the conveyor loading station 29.

At the conveyor loading station 29, the drive blocks drop away and the panel 7 stops moving. Thereafter a limit switch 10 activates and starts the conveyor loading station 29. The pickup blocks move the pickup position for another panel 7, where they are stopped by a limit switch 10.

The conveyor loading station 29 is an hydraulic-driven 12, 18 unit with pickup hooks 26 for transporting a fence panel 7 from the table run-out conveyor 28 to the overhead cable 22 shown in FIG. 7. The pickup hooks 26 are controlled both vertically and horizontally. The conveyor loading station 29 is activated by a limit switch 10 off the table run-out conveyor 28 when the panel 7 is in position for pickup. The first movement is vertical. The pickup hooks 26 lift the fence panel 7 off the table run-out conveyor 28 to a height which clears the conveyor 28. The same set of pickup hooks 26 then carry the panel 7 horizontally toward the overhead cable 22. The pickup hooks 26 carry the panel 7 over a second set of staggered pickup hooks 26 attached to the overhead cable 22, thereby fully extending the hooks 26, activating a limit switch 10, and moving the fence panel 7 downward in a second vertical movement. The result is the setting of the panel 7 on the overhead cable 22 in the second set of staggered hooks 26, to drain the paint from the horizontal runners 3. A one-way limit switch (not shown) then activates a horizontal and vertical retraction of the hooks 26 in a retracting glide slope, thereby returning the hooks 26 to their original start position. The pickup hooks 26 are not ready to transport another fence panel 7. The conveyor loading station 29 includes a vertical roller slide 29a and a horizontal roller slide 29b for transporting the fence panels 7 via the pickup hooks 26.

Figure 3:
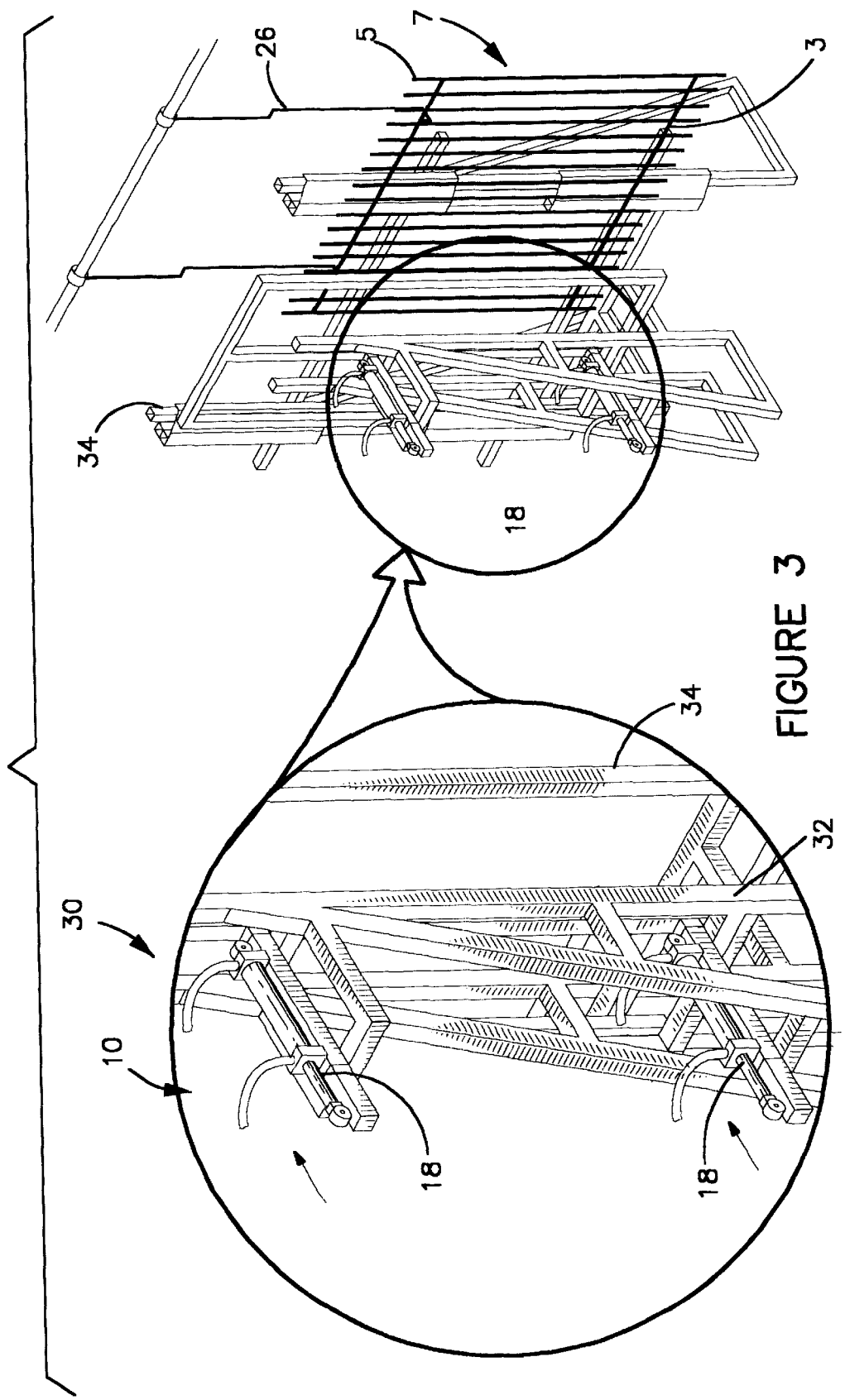
FIG. 3 is a schematic representation of an automated fence section straightener made in accordance with the principles of the present invention.

Reference is now made to FIG. 3, in which is shown an automated fence section straightener, made in accordance with the principles of the present invention, and generally designated by the numeral 30.

The fence section straightener 30 comprises a press member 32, a rigid backstop 34, a pair of hydraulic cylinders 12 to force a fence panel 7 against the backstop 34, and limit switches 10 which control the position of the press member 32.

The fence panel 7, which has been automatedly transferred via the cable 22 and the hooks 26 from the conveyor loading station 29 to the automated fence section straightener 30, is disposed between the press member 32 and the backstop 34.

When the fence panel 7 is "delivered" from the conveyor loading station 29 and disposed between the press member 32 and the backstop 34, a limit switch 10 at the run-out table conveyor 28 (FIGS. 1 and 2) activates the hydraulic cylinders 18, which automatedly and in unison urge the press member 32 and fence panel 7 toward and against the backstop 34, thereby straightening the fence panel 7; and automatedly and in unison release the straightened fence panel 7. The limit switch 10 which controls the pressing operation is the same limit switch used to start the conveyor-loading cycle. After the fence panel 7 has been pressed straight, a second limit switch (not shown) is automatedly activated to retract the press member 32 and thereby complete the press cycle.

The press member 32 has an adjustable press stroke to prevent overcorrection or overbending of the fence panel 7.

Figure 4:
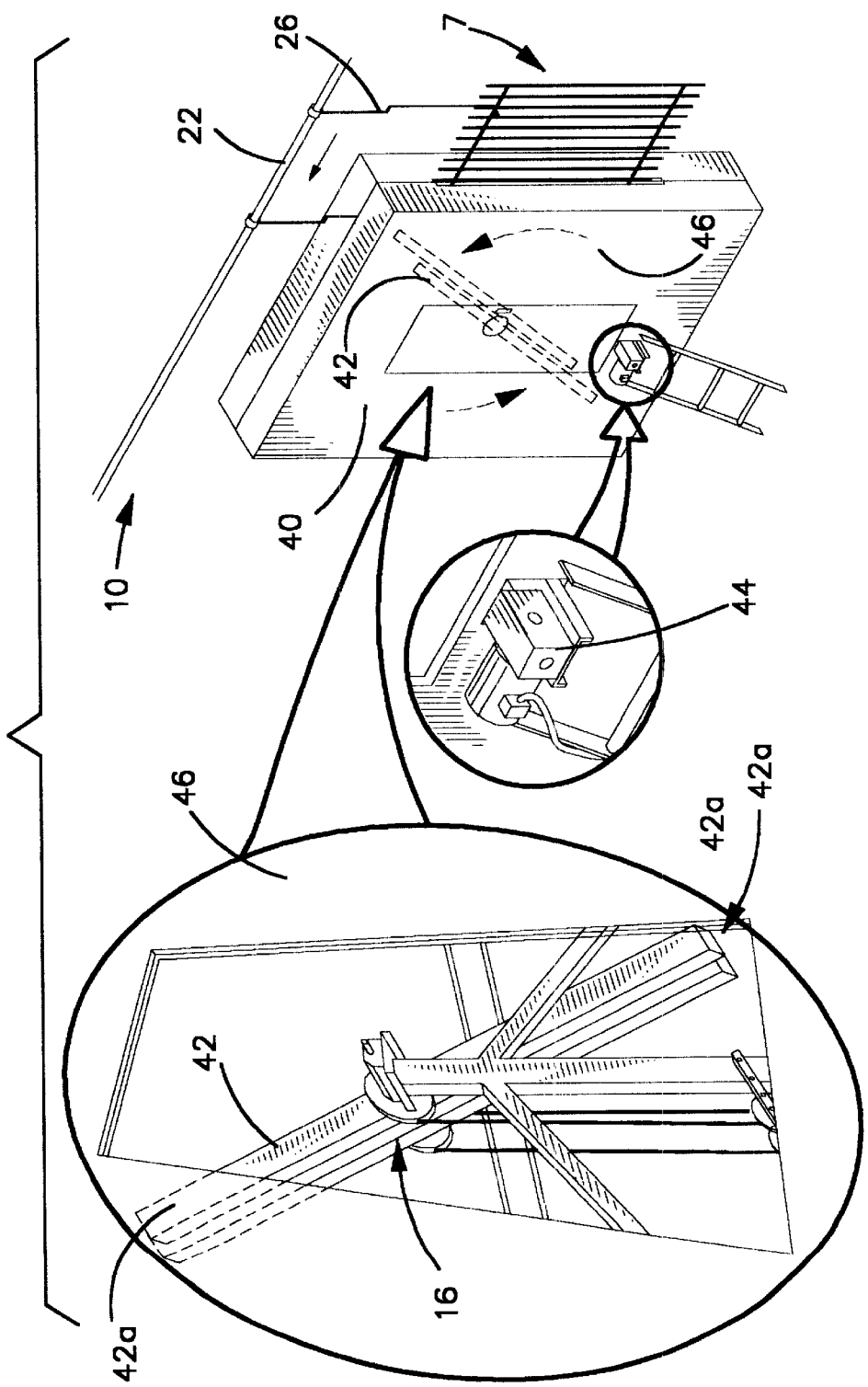
FIG. 4 is a schematic representation of an automated wash tank made in accordance with the principles of the present invention.

Reference is now made to FIG. 4, in which is shown a programmable, self-contained, pressurized wash tank 40 which includes a plurality of rotatable wash arms 42 equipped with high-pressure spray nozzles 42a. The rotatable wash arms 42 are turned via a chain-and-sprocket unit 16 by an electric motor 44, and eject a pressurized spray 46 at and toward a fence panel 7. The spray comprises a mixture of heated degreasing solution and water.

The washing station (not shown) is a metal enclosure with an opening at each end. The openings allow the overhead cable 22, the hooks 26, and the fence panels 7 to pass freely therethrough.

The spray nozzles 42a are usually set at a forty-five degree angle with respect to the fence panel 7. This angle enables washing all sides and parts of the fence panel 7. A pressure-washing pump (not shown) with a gas or electric heat source (not shown) controls the temperature of the wash mixture at approximately 190° F.

The fence panel 7 is transported to and disposed within the pressurized wash tank 40 by means of the overhead cable 22 and hooks 26. Limit switches 10 stop movement of the cable 22 to position and dispose the fence panel 7 within the pressurized wash tank 40. The same limit switches 10 restart movement of the cable 22 to convey the fence panel from the wash tank 40.

Figure 5:
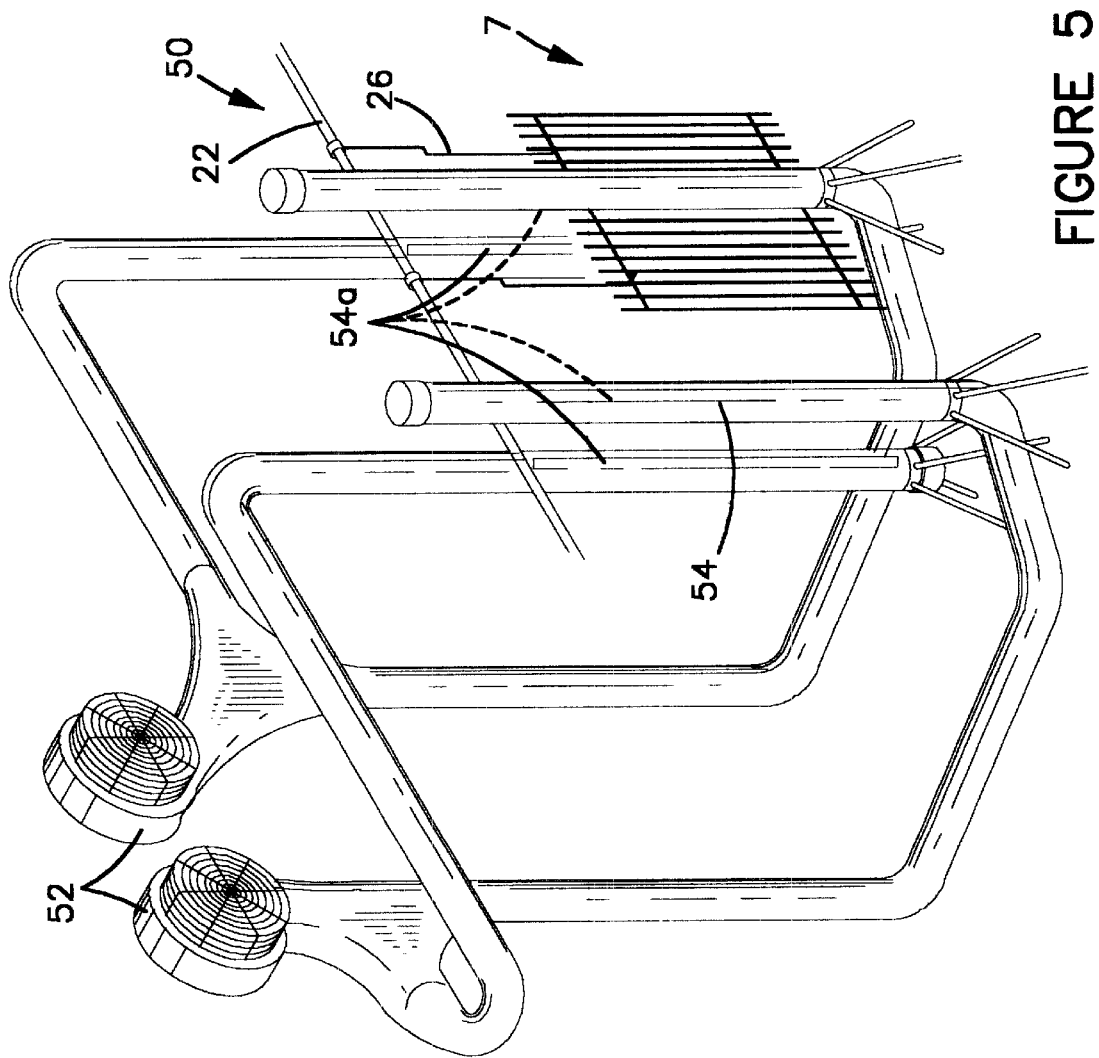
FIG. 5 is a schematic representation of automated machinery for drying a fence panel, made in accordance with the principles of the present invention.

Reference is now made to FIG. 5, in which is shown automated machinery 50 for drying a fence panel 7. The automated drying machinery 50 comprises a pair of programmable air blowers 52 which force compressed air through pipe ducts 54 to air knives 54a. The automated drying machinery 50 is disposed in a programmable drying station (not shown).

A fence panel 7 is transported from the washing station (not shown) and automated wash tank 40 (shown in FIG. 4) to the automated drying machinery 50 and programmable drying station (not shown), using pickup hooks 26 suspended from the overhead cable 22. The fence panel 7 is automatedly passed between juxtaposed, parallel, spaced-apart pipe ducts 54 while air is blown therethrough. The air knives 54a at the distal ends of the ducts 54 increase the pressure of the air, in order to blow excess wash solution from the fence panel 7. The blowers 52 are preferably centrifugal blowers. The air knives 54a are beneficially set at about a forty-five-degree angle with respect to the fence panel 7 for the most efficient drying of the fence panel 7. The drying station works continuously as the fence panel 7 is conveyed therethrough.

Figure 6:
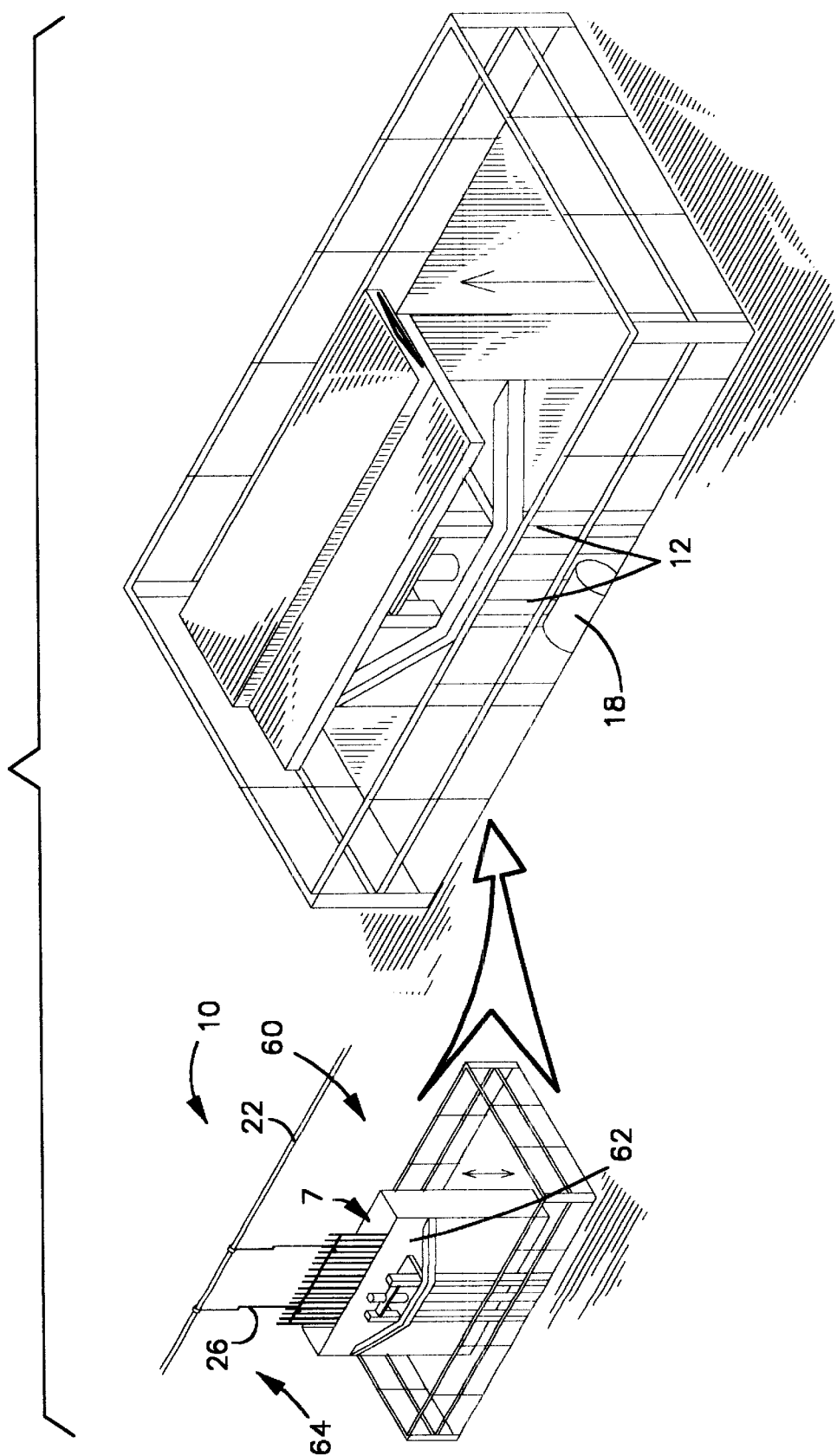
FIG. 6 is a schematic representation of automated machinery for painting a fence panel, made in accordance with the principles of the present invention.

Reference is now made to FIG. 6, in which is shown automated machinery 60 for painting a fence panel 7. Hydraulic cylinders 12 automatically lift a paint tank 62 vertically to submerge therein a stationary fence panel 7 suspended from hooks 26 supported by the overhead cable 22. Programmable timers 64 and limit switches 10 allow a delay of the conveyor system 70 (FIG. 7) sufficient to paint the fence panel 7 and to drain excess paint back into the tank 62 after the tank 62 has been automatically lowered and returned to its starting position.

The paint dip-tank station (not shown) is driven by a hydraulic power unit 18 with a pair of hydraulic cylinders 12 and a vertical slide (not shown). The dip-paint tank 62 is mounted on the vertical slide.

The start cycle for the dipping operation is activated by a relay (not shown) with a start switch (not shown) disposed at the site of the automated welding machine 2 (FIG. 1). A limit switch 10 mounted overhead ensures proper positioning of the panel 7. Another limit switch 10 at the top of the cycle will return the tank 62 to its starting position.

The paint-dip station (not shown) includes a filtration unit 64 to filter out paint contaminants such as soil, metal shavings, etc.

Reference is again made to FIG. 7.

The automated conveyor system 70 is a continuous cable-driven system installed on the outer perimeter of the floor-plan site (not shown). A hydraulic motor 18a in a hydraulic power unit 18 drives the overhead cable 22 at a variable speed using a gear-reduction unit (not shown). The cable 22 has one long and one short hook (not shown) to horizontally "stagger" a fence panel 7 being suspended therefrom. The conveyor system 70 transports the runners 3, pickets 5, and panels 7 (FIG. 1) through the entire fabrication process, then makes a loop to return the pickup hooks 26 to the vicinity of the automated welding machine 2.

The conveyor system 70 and the cable 22 are not limited to straight, linear motion. The cable 22 is capable of turning a corner equal to one-hundred and eighty degrees. A take-up station (not shown) keeps the cable 22 taut.

The conveyor system 70 is operable in both manual and automatic modes. In the preferred automatic mode, a cycle is started by a start switch (not shown) proximate the automated welding machine 2 (FIG. 1), and is stopped by a limit switch 10 proximate the dip-paint tank 62 (FIG. 6). In the manual mode it can be started and stopped at any point in the cycle.

I claim:

1. An automated method for fabricating components of a wrought-iron fence, the method comprising the steps of:

(a) providing a plurality of horizontal runners and a plurality of vertical pickets;

(b) automatedly welding the vertical pickets to the horizontal runners to form a fence panel;

(c) automatedly transferring the fence panel to a table run-out conveyor;

(d) utilizing the table run-out conveyor to automatedly transfer the fence panel to a conveyor loading station which includes a hydraulic-driven unit with pickup hooks capable of conveying the fence panel;

(e) utilizing the hydraulic-driven unit to automatedly transfer the fence panel to an overhead conveyor line;

(f) utilizing the overhead conveyor line to automatedly transfer the fence panel to a fence section straightener;

(g) utilizing the fence section straightener to automatedly straighten the fence panel;

(h) utilizing the overhead conveyor line to automatedly transfer the straightened fence panel to a wash tank;

(i) utilizing the wash tank to automatedly wash the fence panel;

(j) utilizing the overhead conveyor line to automatedly transfer the washed fence panel to a drying station;

(k) utilizing the drying station to automatedly dry the washed fence panel;

(l) utilizing the overhead conveyor line to automatedly transfer the dried fence panel to a paint tank; and (m) utilizing the paint tank to automatedly paint the fence panel;

the vertical pickets being automatedly welded to the horizontal runners by (n) automatedly and pneumatically clamping the horizontal runners and vertical pickets to one another on a movable carriage in a disposition for welding the vertical pickets to the horizontal runners in a perpendicular configuration; and (o) automatedly indexing the carriage with a slower speed for while welding is in progress, and a faster speed for conveying the clamped horizontal runners and vertical pickets to and under a plurality of welding guns for welding, and away from the welding guns after the vertical pickets have been welded to the horizontal runners;

the fence panel being automatedly straightened by providing a programmable fence section straightener which includes programming means, limit switches, hydraulic cylinders, and a rigid backstop; programming the fence section straightener to automatedly stop movement of the conveyor line, using the limit switches; programming the hydraulic cylinders to operate automatedly and in unison to urge the fence panel against the backstop, thereby automatedly straightening the fence panel; and programming the hydraulic cylinders to automatedly and in unison release the straightened fence panel;

the fence panel being automatedly washed by providing a programmable, self-contained, pressurized wash tank which includes programming means, limit switches, and rotatable wash arms equipped with high-pressure spray nozzles; programming the limit switches to automatedly stop movement of the conveyor line and dispose the fence panel within the wash tank; programming the wash arms to rotate while ejecting a pressurized spray comprising a mixture of heated degreasing solution and water toward the fence panel; using the limit switches to automatedly stop movement of the conveyor line and dispose the fence panel within the wash tank; and washing the fence panel by automatedly rotating the wash arms while ejecting the pressurized spray toward the fence panel;

the fence panel being automatedly dried by providing a programmable drying station which includes programming means, a pair of blowers, a plurality of ducts, and a plurality of air knives connected thereto which restrict the flow of air therethrough; programming the blowers to force air through the ducts to the air knives; and automatedly operating the blowers to force air through the ducts to the air knives, which restrict the flow of air, thereby increasing the air pressure, to blow excess wash liquid from the fence panel while using the overhead conveyor line to pass the fence panel between the ducts, thereby drying the fence panel;

the fence panel being automatedly painted by providing a dip-paint tank powered by programmable hydraulic cylinders; providing a plurality of programmable timers and limit switches to allow a predetermined and temporary stoppage of movement of the overhead conveyor line, to immobilize a fence panel suspended therefrom for a period of time sufficient to dip the fence panel in the dip-paint tank, and to drain excess paint from the fence panel; programming the timers and limit switches to allow a predetermined and temporary stoppage of movement of the overhead conveyor line, to immobilize a fence panel suspended therefrom for a period of time sufficient to have the fence panel dipped in the dip-paint tank, and to drain excess paint from the fence panel; programming the hydraulic cylinders to automatedly and vertically lift the dip-paint tank to a level such that the fence panel suspended from the overhead conveyor line is submerged in the dip-paint tank; programming the hydraulic cylinders to lower the dip-paint tank to its original position; using the hydraulic cylinders to automatedly and vertically lift the dip-paint tank, to submerge therein a stationary fence panel suspended from the overhead conveyor line; and using the hydraulic cylinders to automatedly lower the dip-paint tank to its original position, while using the timers and limit switches to allow a predetermined delay of movement of the overhead conveyor line, to paint the fence panel and to drain excess paint from the fence panel to the dip-paint tank; and the overhead conveyor line being automatedly operated by providing a plurality of air-over-hydraulic power-unit cables; providing a plurality of programmable timers and limit switches, to control the power-unit cables; and programming the timers and limit switches to impose a predetermined schedule, pattern, and sequence of movement on the overhead conveyor line by controlling the power-unit cables in accordance with timing needs and constraints required to automatedly weld, straighten, wash, dry, and paint a fence panel.

2. An automated method for welding a plurality of vertical pickets to a plurality of horizontal runners, for fabricating components of a wrought-iron fence, the method comprising the steps of:

(a) providing a programmable welding machine which includes programming means, clamping means, speed-indexing means, a movable carriage, and a plurality of welding guns;

(b) programming the welding machine to automatedly clamp the horizontal runners and vertical pickets in a perpendicular configuration on the movable carriage for welding the vertical pickets to the horizontal runners; and (c) programming the carriage to move at a slower speed for while welding is in progress, and at a faster speed for conveying the clamped horizontal runners and vertical pickets to and under the welding guns for welding, and away from the welding guns after the vertical pickets have been welded to the horizontal runners.

3. An automated method for straightening a fence panel, the method comprising the steps of:

(a) providing a programmable fence section straightener which includes programming means, limit switches, hydraulic cylinders, and a rigid backstop;

(b) programming the fence section straightener to automatedly stop movement of a conveyor line, using the limit switches;

(c) programming the hydraulic cylinders to operate automatedly and in unison to urge the fence panel against the backstop, thereby automatedly straightening the fence panel; and (d) programming the hydraulic cylinders to automatedly and in unison release the straightened fence panel.

4. An automated method for washing a fence panel, the method comprising the steps of:

(a) providing a programmable, self-contained, pressurized wash tank which includes programming means, limit switches, and rotatable wash arms equipped with high-pressure spray nozzles;

(b) programming the limit switches to automatedly stop movement of a conveyor line and dispose the fence panel within the wash tank;

(c) programming the wash arms to rotate while ejecting a pressurized spray comprising a mixture of heated degreasing solution and water toward the fence panel;

(d) using the limit switches to automatedly stop movement of the conveyor line and dispose the fence panel within the wash tank; and (e) washing the fence panel by automatedly rotating the wash arms while ejecting the pressurized spray toward the fence panel.

5. An automated method for drying a fence panel, the method comprising the steps of:

(a) providing a programmable drying station which includes programming means, a pair of blowers, a plurality of ducts, and a plurality of air knives connected thereto which restrict the flow of air therethrough;

(b) programming the blowers to force air through the ducts to the air knives; and (c) automatedly operating the blowers to force air through the ducts to the air knives, which restrict the flow of air, thereby increasing the air pressure, to blow excess wash liquid from the fence panel while (d) using an overhead conveyor line to pass the fence panel between the ducts, thereby drying the fence panel.

6. An automated method for painting a fence panel, the method comprising the steps of:

(a) providing a dip-paint tank powered by programmable hydraulic cylinders;

(b) providing a plurality of programmable timers and limit switches to allow a predetermined and temporary stoppage of movement of an overhead conveyor line, to immobilize a fence panel suspended therefrom for a period of time sufficient to dip the fence panel in the dip-paint tank, and to drain excess paint from the fence panel;

(c) programming the timers and limit switches to allow a predetermined and temporary stoppage of movement of the overhead conveyor line, to immobilize a fence panel suspended therefrom for a period of time sufficient to have the fence panel dipped in the dip-paint tank, and to drain excess paint from the fence panel;

(d) programming the hydraulic cylinders to automatedly and vertically lift the dip-paint tank to a level such that the fence panel suspended from the overhead conveyor line is submerged in the dip-paint tank;

(e) programming the hydraulic cylinders to lower the dip-paint tank to its original position;

(f) using the hydraulic cylinders to automatedly and vertically lift the dip-paint tank, to submerge therein a stationary fence panel suspended from the overhead conveyor line; and (g) using the hydraulic cylinders to automatedly lower the dip-paint tank to its original position, while (h) using the timers and limit switches to allow a predetermined delay of movement of the overhead conveyor line, to paint the fence panel and to drain excess paint from the fence panel to the dip-paint tank.

7. An automated method for operating an overhead conveyor line, the method comprising the steps of:

(a) providing a plurality of air-over-hydraulic power-unit cables;

(b) providing a plurality of programmable timers and limit switches, to control the power-unit cables; and (c) programming the timers and limit switches to impose a predetermined schedule, pattern, and sequence of movement on the overhead conveyor line by controlling the power-unit cables in accordance with timing needs and constraints required to automatedly weld, straighten, wash, dry, and paint a fence panel.

* * * * *